United States Patent
Brailean

(10) Patent No.: US 9,140,269 B2
(45) Date of Patent: Sep. 22, 2015

(54) DRY GAS SEAL ASSEMBLY

(75) Inventor: Gordon E. Brailean, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 732 days.

(21) Appl. No.: 13/433,434

(22) Filed: Mar. 29, 2012

(65) Prior Publication Data

US 2013/0259679 A1    Oct. 3, 2013

(51) Int. Cl.
*F04D 29/12*   (2006.01)
*F16J 15/00*   (2006.01)
*F16J 15/34*   (2006.01)

(52) U.S. Cl.
CPC ............ *F04D 29/122* (2013.01); *F16J 15/008* (2013.01); *F16J 15/3484* (2013.01); *F16J 15/3496* (2013.01)

(58) Field of Classification Search
CPC ..... F04D 29/10; F04D 29/102; F04D 29/104; F04D 29/106; F04D 29/12; F04D 29/122; F04D 29/126; F16J 15/34; F16J 15/3436; F16J 15/3464; F16J 15/348; F16J 15/3484; F16J 15/3496; F16J 15/008
USPC ............ 415/113, 174.1, 174.2, 231; 277/353, 277/348, 352, 368, 369, 370, 371, 390
See application file for complete search history.

(56) References Cited

U.S. PATENT DOCUMENTS

| 4,537,385 | A | * | 8/1985 | Bragg et al. ................... 251/214 |
| 4,776,759 | A | | 10/1988 | Maskell et al. |
| 5,137,284 | A | | 8/1992 | Holder |
| 5,412,977 | A | * | 5/1995 | Schmohl et al. ................... 73/46 |
| 5,934,683 | A | | 8/1999 | Sieghartner |
| 6,454,523 | B1 | * | 9/2002 | Loyd et al. ................... 415/58.4 |
| 7,854,587 | B2 | | 12/2010 | Ito et al. |
| 7,896,354 | B2 | | 3/2011 | Muramatsu |

FOREIGN PATENT DOCUMENTS

EP    0 701 074 A1    3/1996
GB    2 206 161 A    12/1988

* cited by examiner

*Primary Examiner* — Edward Look
*Assistant Examiner* — Danielle M Christensen
(74) *Attorney, Agent, or Firm* — Procopio, Cory, Hargreaves & Savitch LLP

(57) ABSTRACT

A seal assembly forms a barrier between a compressor's interior and exterior regions. The seals assembly includes a primary seal stage and a secondary seal stage. The primary seal stage is formed of materials chosen to effectively block flow of gas through the seal assembly. The secondary seal stage is formed of materials chosen to survive a failure of the primary seal stage.

20 Claims, 2 Drawing Sheets

DRY GAS SEAL ASSEMBLY

TECHNICAL FIELD

The present disclosure generally pertains to a seal between relatively movable parts and more particularly to a tandem dry gas seal suitable for use with a centrifugal compressor.

BACKGROUND

Seal systems are used in a wide variety of rotary shaft devices, such as blowers, compressors, and pumps, which have critical sealing requirements. Dry gas seal systems provide a barrier between the gas in the working chamber, or process gas, and the external environment to minimize the loss of process gas to the environment. Seal systems may include two stages of seals arranged in tandem to improve reliability. Mosley and Haynes, in European Patent Application publication EP 0 701 074 A1, describe a dry gas seal with two face seal stages of the same construction.

Dry gas seals operate with very small gaps or separations between opposed sealing surfaces. Brittle materials such silicon or tungsten carbide are used for some sealing surfaces to provide precise surfaces for small separations between the opposed sealing surfaces. Such materials may, however, fail and a failure can be catastrophic.

The present disclosure is directed toward overcoming one or more of the problems discussed above as well as additional problems discovered by the inventor.

SUMMARY OF THE DISCLOSURE

A seal assembly includes a primary seal stage and a secondary seal stage. The primary seal stage includes a primary ring arranged to be coupled to a housing and a mating ring arranged to be coupled to a rotating shaft. The primary ring and the mating ring of the primary seal stage are formed materials chosen to effectively block flow of gas through the seal assembly. The secondary seal stage is coaxially positioned with respect to the primary seal stage and includes a primary ring arranged to be coupled to the housing and a mating ring arranged to be coupled to the rotating shaft. The primary ring and the mating ring of the secondary seal stage are formed of materials chosen to survive a failure of the primary seal stage. The seal assembly may be used in a compressor for sealing a penetration of the compressor's shaft through the compressor's housing.

DETAILED DESCRIPTION

Figure 1:
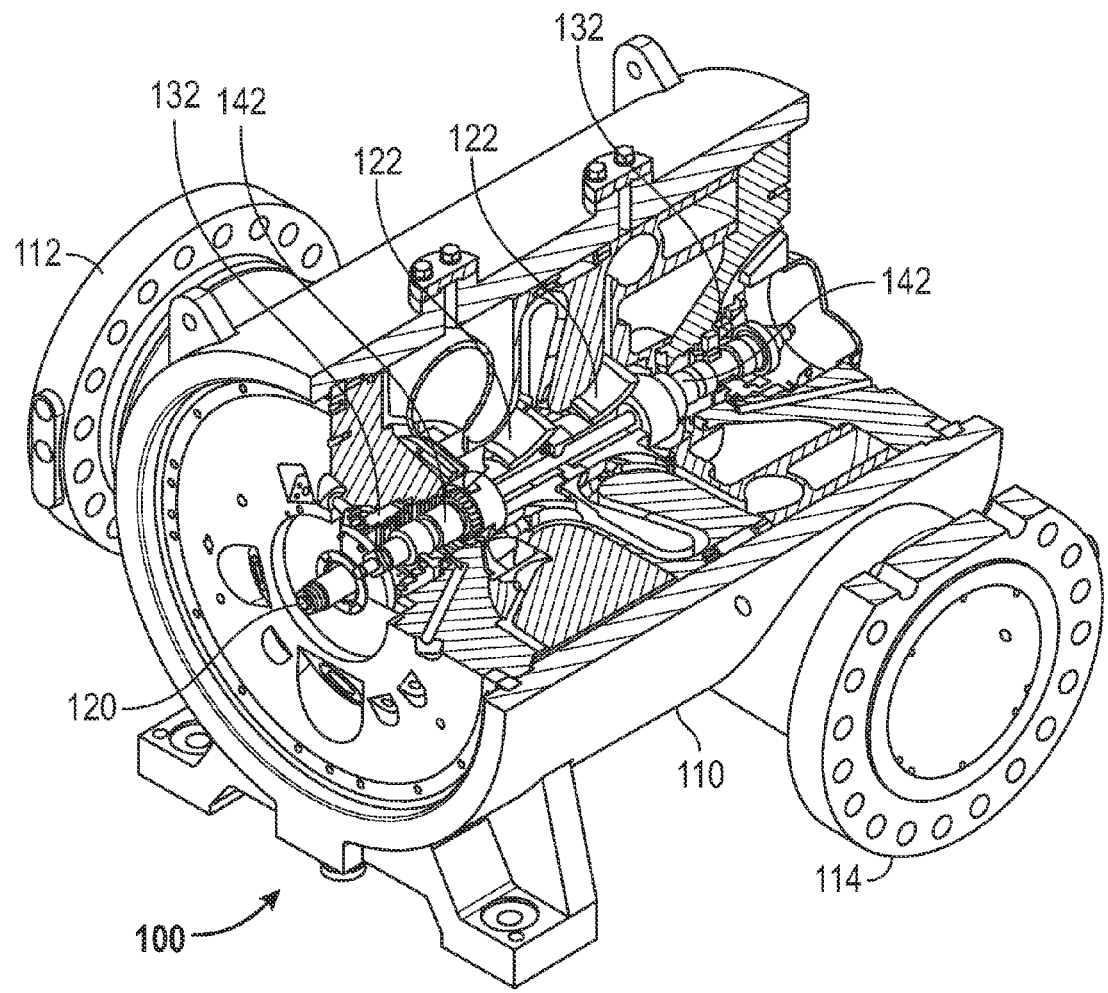
FIG. 1 is a cutaway illustration of an exemplary centrifugal compressor.

FIG. 1 is a cutaway illustration of an exemplary centrifugal compressor 100. Process gas enters the centrifugal compressor 100 at a suction port 112 formed on a housing 110. The process gas is compressed by one or more centrifugal impellers 122 mounted to a shaft 120. The compressed process gas exits the centrifugal compressor 100 at a discharge port 114 that is formed on the housing 110.

The shaft 120 and attached elements such as the centrifugal impellers 122 are supported by bearings 132 installed on axial ends of the shaft 120. Seal assemblies 142 are disposed about the shaft 120 inward of the bearings 132. The seal assemblies 142 seal high pressure inside the centrifugal compressor 100. Different designs may use more or fewer seal assemblies 142.

The seal assemblies 142 include primary and secondary seal stages. The primary seal stage normally operates to block the flow of the process gas out of the compressor. The secondary seal stage may be considered a backup to block the flow of the process gas out of the compressor in the event of failure or malfunction of the primary seal stage. In an embodiment, the secondary and primary seal stages are substantially identical but formed of different materials.

Figure 2:
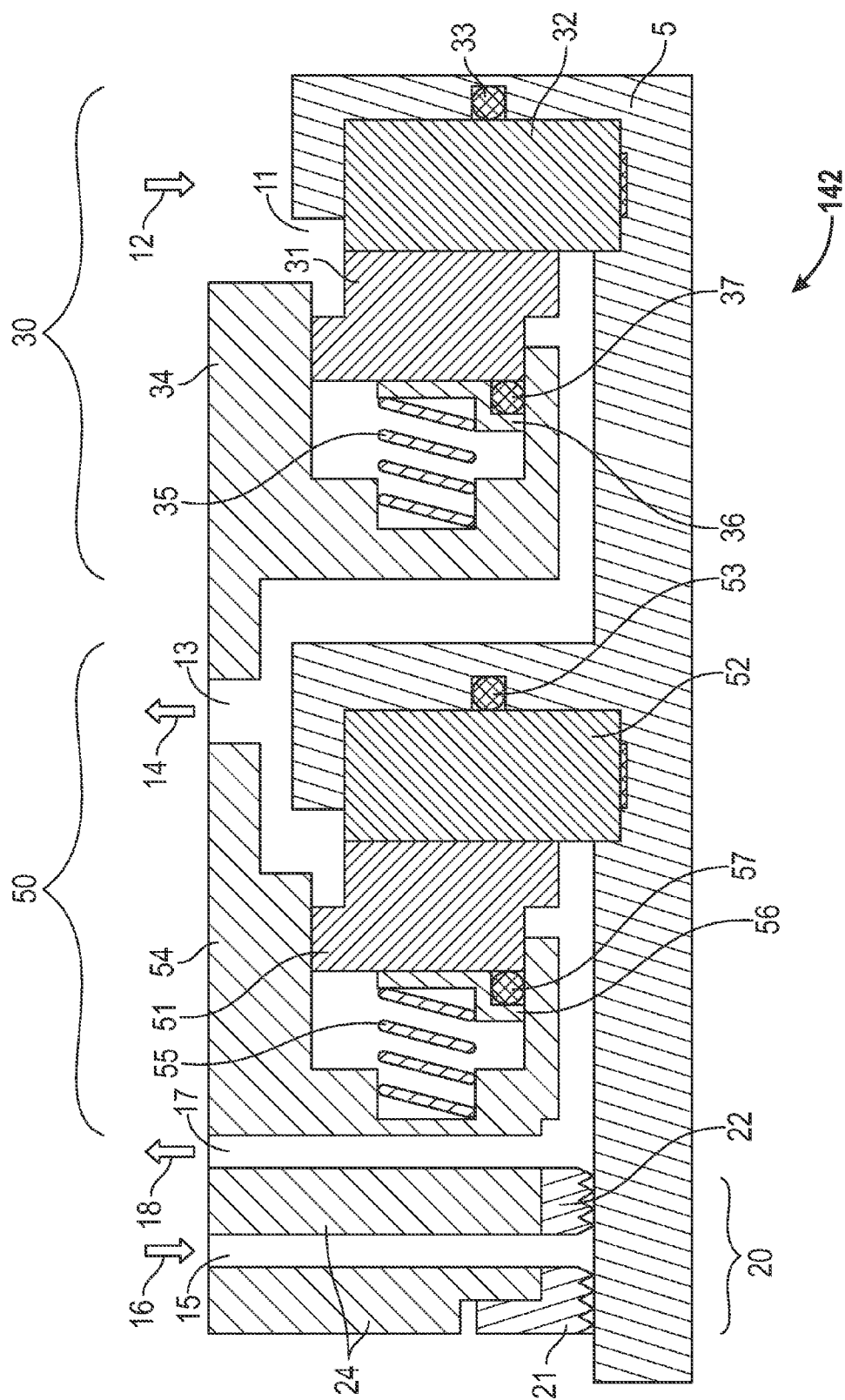
FIG. 2 is a cross-sectional view of a seal assembly according to an exemplary disclosed embodiment.

FIG. 2 is a cross-sectional view of a seal assembly 142. The elements of the seal assembly are generally ring shaped or radially disposed about a central axis of the seal assembly. FIG. 2 illustrates a cross-section of one side of a symmetrical seal assembly. The seal assembly may be used as the seal assemblies 142 of the centrifugal compressor 100 of FIG. 1. The seal assembly of FIG. 2 includes a primary seal stage 30 and a secondary seal stage 50. The primary seal stage 30 is disposed at an inner, or process gas, end of the seal assembly 142. The secondary seal stage 50 is disposed at an outer, or bearing, end of the seal assembly 142.

The seal assembly is illustrated in FIG. 2 adjacent to a buffer seal 20. The buffer seal 20 includes segmented carbon rings 21, 22 held in a buffer seal housing 24. Radial passages in the buffer seal housing 24 provide a purge inlet 15. A secondary vent 17 is disposed between the buffer seal 20 and the secondary seal stage 50. A primary vent 13 is disposed between the primary seal stage 30 and the secondary seal stage 50. A primary inlet 11 is disposed on the process gas end of the primary seal stage 30.

When the seal assembly illustrated in FIG. 2 is used in a compressor, various gas flows exist during operation. In an embodiment, filtered process gas 12 flows into the primary inlet 11. Some of the filtered process gas leaks through the primary seal stage 30. The filtered process gas that leaks through the primary seal stage 30 passes out the primary vent 13 as a primary vent gas 14 which may then be collected or, for example, for natural gas, flared off. A purge gas 16, such as nitrogen, flows into the purge inlet 15. Some of the purge gas flows past the segmented carbon ring 22 and out the secondary vent 17 as a secondary vent gas 18. Some of the filtered process gas that leaked through the primary seal stage 30 also leaks through the secondary seal stage 50 and out the secondary vent 17.

The flows through or pressures in the primary inlet 11, the primary vent 13, the purge inlet 15, and the secondary vent 17 are monitored to control operation of the seal. The monitoring can also be used to detect a malfunction or abnormal operation of the seal. A system monitoring the seal can shut down the compressor when abnormal operation is detected.

The primary seal stage 30 includes a sleeve 5. The sleeve 5 may be coupled to the shaft of a compressor. The sleeve 5 may be formed of a stainless steel. A mating ring 32 is disposed in an opening of the sleeve 5. A sleeve O-ring 33 is disposed in a slot in the opening of the sleeve 5. The sleeve O-ring 33 provides a static seal between the sleeve 5 and the mating ring 32. The sleeve O-ring 33 may be made of a polymer, for example, polytetrafluoroethylene (PTFE).

The primary seal stage 30 also includes a primary ring 31 disposed in an opening of a retainer 34. The retainer 34 may be formed of a stainless steel. The retainer 34 may be coupled to the housing of a compressor. The primary ring 31 and the mating ring 32 include corresponding opposing faces.

A spring 35 biases the primary ring 31 towards the mating ring 32. Although one spring is illustrated in FIG. 2, the primary seal stage 30 may have multiple springs circumferentially distributed around the central axis of the seal assembly 142. The spring 35 may be formed of a superalloy. A spring plate 36 is disposed between the spring 35 and the primary ring 31. A retainer O-ring 37 is disposed between the spring plate 36 and the retainer 34 and provides a static seal between the spring plate 36 and the retainer 34. The retainer O-ring 37 may be made of a polymer, for example, PTFE.

The mating ring 32 of the primary seal stage 30 is made of a brittle material. In an embodiment, the primary ring 31 of the primary seal stage 30 is also made of a brittle material. The primary ring 31 and the mating ring 32 may be made of the same material or different materials. The primary ring 31 and mating ring 32 of the primary seal stage 30 may be coated with additional materials, for example, the rings may be diamond coated. In another embodiment, the primary ring 31 is made of a more flexible material, such as a carbon composite. Brittle materials provide precise shapes that experience limited distortion during operation at high gas pressures, for example, 1000 PSI, high rotational speeds, for example, 20,000 RPM, and high temperatures, for example, 400° C.

Ductile and brittle materials are distinguished by the relationships between stresses and strains in the materials. Ductile materials can withstand relatively large strains before failure. Objects made of either type of material exhibit elastic deformation in response to initial stresses. When stresses are removed after elastic deformation, the objects return to their initial shapes.

Objects made of ductile materials exhibit plastic deformation in response to stresses greater than an elasticity limit. When stresses are removed after plastic deformation, the objects do not return to their initial shapes. Plastic deformation can result in a large deformation in a ductile material, for example, 15%, before the material fractures. An example ductile material is steel. A material may be considered ductile when it can be deformed more than 5% in plastic deformation.

Objects made of brittle materials do not exhibit large plastic deformations. Objects made of brittle materials abruptly fracture in response to stresses greater than a fracture limit. Example brittle materials include tungsten carbide and silicon carbide. A material may be considered brittle when it can be deformed less than 5% before fracture.

The secondary seal stage 50 includes a portion of the sleeve 5 in the embodiment of FIG. 2. In other embodiments, the secondary seal stage 50 may include a separate sleeve. The secondary seal stage 50 includes a mating ring 52 disposed in an opening of the sleeve 5. A sleeve O-ring 53 is disposed in a slot in the opening of the sleeve 5. The sleeve O-ring 53 provides a static seal between the sleeve 5 and the mating ring 52. The sleeve O-ring 53 may be made of a polymer, for example, PTFE.

The secondary seal stage 50 also includes a primary ring 51 disposed in an opening of a retainer 54. The retainer 54 may be formed of a stainless steel. The retainer 54 may be coupled to the housing of a compressor. The primary ring 51 and the mating ring 52 include corresponding opposing faces.

A spring 55 biases the primary ring 51 towards the mating ring 52. Although one spring is illustrated, the secondary seal stage 50 may have multiple springs circumferentially distributed around the central axis of the seal assembly 142. The spring 55 may be formed of a superalloy. A spring plate 56 is disposed between the spring 55 and the primary ring 51. A retainer O-ring 57 is disposed between the spring plate 56 and the retainer 54 and provides a static seal between the spring plate 56 and the retainer 54. The retainer O-ring 57 may be made of a polymer, for example, PTFE.

The mating ring 52 of the secondary seal stage 50 is made of a ductile material, for example, steel. In an embodiment, the primary ring 51 of the secondary seal stage 50 is also made of a ductile material. The primary ring 51 and the mating ring 52 may be made of the same material or different materials. The primary ring 51 and the mating ring 52 of the secondary seal stage 50 may be strengthened by surface treatment, for example, using induction heating. In another embodiment, the primary ring 51 is made of a more flexible material, such as a carbon composite.

INDUSTRIAL APPLICABILITY

The rate that gases leak between the sealing faces of the primary ring 31 and the mating ring 32 is decreased when the faces are closely spaced. The primary ring 31 and the mating ring 32 may be spaced, for example, by a few microns. The components of the seal assembly 142 are subject to shape distortion by thermal changes, gas pressures, and rotational forces.

Prior seal assemblies have used primary and secondary seal stages made of the same materials. Early seal assemblies used mating rings, in both primary and secondary seal stages, made of steel, a ductile material. The seal assemblies used primary rings, in both primary and secondary seal stages, made of a carbon composite material. The carbon composite used is relatively flexible (having a low modulus of elasticity) and low strength compared to the mating ring. The carbon composite is also quite brittle. The carbon composite, because of its low strength, is generally not used as for the mating ring, which rotates.

For use at higher pressures, prior seal assemblies use mating rings, in both primary and secondary seal stages, made of tungsten carbide or silicon carbide, brittle materials. The relatively flexible primary rings conformed against the much stiffer mating rings creating the desired small spacing between the faces of the primary and mating rings. For use at still higher pressures, other prior seal assemblies use mating rings and primary rings, in both primary and secondary seal stages, made of tungsten carbide or silicon carbide.

A seal assembly using a carbide mating ring and a carbon primary ring can fail when the highly stressed mating ring develops cracks due to thermal, rotational, and pressure induced stresses. When the mating ring fails, the carbide material can break up into pieces with jagged edges. With rotation, these pieces can cut into and break up the carbon primary ring causing destruction of the primary ring.

The carbon primary ring is not typically considered the initiator of a failure. If the carbon primary ring were to crack first, since it has low strength, it would not cause another ring to crack and break up. Although the gas flow would increase due to the cracks in the carbon ring, the flow would still be low compare to when pieces of the rings are liberated opening up large flow paths.

A seal assembly using a carbide mating ring and a carbide primary ring can fail in the same manner. Breakup of one of the carbide rings liberates hard pieces which can cause the other carbide ring to fail.

The present seal assembly 142 uses materials in the primary seal stage 30 and the secondary seal stage 50 selected for the distinct functions of the stages. The seal assembly is both very effective at blocking the flow of gases and very rugged. The primary seal stage 30 is effective at blocking flow of gases. The primary seal stage 30 may [add example of seal performance]. The ruggedness of the secondary seal stage 50 can allow it to survive a failure of the primary seal stage.

The materials used in the primary ring 31 and the mating ring 32 of the primary seal stage 30 are selected for their superior performance as a gas seal. For intermediate to high gas pressures at least one of the rings is a rigid material like silicon carbide or tungsten carbide. In some embodiments, both the primary ring 31 and the mating ring 32 are made of these types of materials. Although these materials provide superior seal performance at elevated pressures, in the event of a failure, fracturing and liberation of pieces of these rigid, brittle materials often results in large openings within the seal assembly, which causes excessive amounts of pressurized gas to escape.

The materials used in the primary ring 51 and the mating ring 52 of the secondary seal stage 50 are selected for their ruggedness in the event of a failure of the primary seal stage 30 in addition to performance as a gas seal. The use of a ductile material, like steel, in the highly stressed rotating mating ring 52 mitigates the possibility of pieces of the mating ring 52 being liberated as in the case of a brittle material failure. In various embodiments, the primary ring 51 is made from a ductile material or a carbon material, which is a relatively flexible although somewhat brittle. These materials result in the primary ring remaining more intact and in place after a failure than rings made of the materials used in the primary seal stage.

The disclosed seal assembly embodiments may be suited for any number of industrial applications, such as various aspects of the oil and natural gas industry. For example, applications for compressors with the disclosed seal assemblies may include transmission, gathering, storage, withdrawal, and lifting of oil and natural gas.

The seal assemblies discussed above may be used in servicing a compressor in the field. An existing seal assembly may be removed and replaced with a new seal assembly. The new seal assembly is of a type disclosed above.

The preceding detailed description is merely exemplary in nature and is not intended to limit the invention or the application and uses of the invention. The described embodiments are not limited to use in conjunction with a particular type of compressor. Hence, although the present disclosure, for convenience of explanation, depicts and describes a seal assembly for a centrifugal compressor, it will be appreciated that seal assemblies in accordance with this disclosure can be implemented in various other configurations and used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A seal assembly comprising:
a primary seal stage including a primary ring arranged to be coupled to a housing and a mating ring arranged to be coupled to a rotating shaft, the mating ring formed of a brittle material; and
a secondary seal stage coaxially positioned with respect to the primary seal stage and including a primary ring arranged to be coupled to the housing and a mating ring arranged to be coupled to the rotating shaft, the primary ring and the mating ring each formed of a ductile material:
wherein, the brittle material fractures at a lower strain level than the strain level at which the ductile material fractures.

2. The seal assembly of claim 1, wherein the primary seal stage further includes a retainer arranged to be coupled to the housing, wherein the primary ring of the primary seal stage is disposed in an opening of the retainer of the primary seal stage, wherein the secondary seal stage further includes a retainer arranged to be coupled to the housing, and wherein the primary ring of the secondary seal stage is disposed in an opening of the retainer of the secondary seal stage.

3. The seal assembly of claim 1, further comprising a sleeve arranged to be coupled to the rotating shaft, wherein the mating ring of the primary seal stage is disposed in a first opening of the sleeve, and wherein the mating ring of the secondary seal stage is disposed in a second opening of the sleeve.

4. The seal assembly of claim 1, wherein the primary seal stage further includes a spring arranged to bias the opposed faces of the primary ring and the mating ring of the primary seal stage together, and wherein the secondary seal stage further includes a spring arrange to bias the opposed faces of the primary ring and the mating ring of the secondary seal stage together.

5. The seal assembly of claim 1, wherein the brittle material is silicon carbide.

6. The seal assembly of claim 1, wherein the brittle material is tungsten carbide.

7. The seal assembly of claim 1, wherein the ductile material is steel.

8. The seal assembly of claim 1, wherein the ductile material is able to be strained by at least five percent without fracturing.

9. The seal assembly of claim 1, wherein the primary ring and the mating ring of the secondary seal stage are strengthened by a surface treatment.

10. A compressor, comprising:
a housing including a suction port and a discharge port;
a shaft penetrating the housing;
a centrifugal impellor fixed to the shaft and arranged for compressing a gas from the suction port to the discharge port;
a seal assembly circumscribing the shaft near a location where the shaft penetrates the housing, the seal assembly comprising:
a primary seal stage including a primary ring coupled to the housing and a mating ring coupled to the shaft, the mating ring formed of a brittle material; and
a secondary seal stage coaxially positioned outside the primary seal stage and including a primary ring coupled to the housing and a mating ring coupled to the rotating shaft, the primary ring and the mating ring each formed of a ductile material;
wherein, the brittle material fractures at a lower strain level than the strain level at which the ductile material fractures.

11. The compressor of claim 10, wherein the secondary seal stage is arranged for temporary operation.

12. The compressor of claim 10, wherein
the ductile material is able to be strained by at least five percent without fracturing.

13. The compressor of claim 10, further comprising a second seal assembly circumscribing the shaft near a second location where the shaft penetrates the housing, the second seal assembly comprising:
a primary seal stage including a primary ring coupled to the housing and a mating ring coupled to the shaft, the mating ring formed of a brittle material; and
a secondary seal stage coaxially positioned with respect to the primary seal stage and including a primary ring coupled to the housing and a mating ring coupled to the rotating shaft, the mating ring formed of a ductile material;

wherein, the brittle material fractures at a lower strain level than the strain level at which the ductile material fractures.

14. A seal assembly comprising:

a primary seal stage including a primary ring arranged to be coupled to a housing and a mating ring arranged to be coupled to a rotating shaft; and a secondary seal stage coaxially positioned with respect to the primary seal stage and including a primary ring arranged to be coupled to the housing and a mating ring arranged to be coupled to the rotating shaft, wherein the primary ring and the mating ring of the primary seal stage are formed of materials chosen to effectively block flow of gas through the seal assembly, and wherein the primary ring and the mating ring of the secondary seal stage are formed of materials chosen to fracture at a higher strain level than the primary ring and the mating ring of the primary seal stage to survive a failure of the primary seal stage.

15. The seal assembly of claim 14, wherein the materials of the primary seal stage include a brittle material, and wherein the materials of the secondary seal stage include a ductile material, wherein the brittle material fractures at a strain less than five percent strain and the ductile material is strained at least five percent without fracturing.

16. The seal assembly of claim 14, wherein the mating ring of the primary seal stage is formed of a brittle material, and wherein the mating ring of the secondary seal stage is formed of a ductile material, wherein the ductile material is strained at least five percent without fracturing.

17. The seal assembly of claim 16, wherein the primary ring of the primary seal stage is formed of a brittle material, wherein the brittle material fractures at a strain less than five percent strain.

18. The seal assembly of claim 16, wherein the primary ring of the primary seal stage is formed of a carbon material.

19. The seal assembly of claim 16, wherein the primary ring of the secondary seal stage is formed of a carbon material.

20. The seal assembly of claim 16, wherein the primary ring of the secondary seal stage is formed of a ductile material, wherein the ductile material is strained at least five percent without fracturing.

* * * * *